United States Patent [19]

Wittmann et al.

[11] Patent Number: 4,985,492

[45] Date of Patent: Jan. 15, 1991

[54] POLYPHENYLENE ETHER MOLDING COMPOSITIONS

[75] Inventors: Dieter Wittmann, Cologne; Thomas Eckel, Dormagen; Karl-Heinz Ott, Leverkusen; Volker Damrath, Burscheid; Uwe Westeppe, Remscheid, all of Fed. Rep. of Germany

[73] Assignee: Bayer Aktiengesellschaft, Leverkusen, Fed. Rep. of Germany

[21] Appl. No.: 341,215

[22] Filed: Apr. 21, 1989

[30] Foreign Application Priority Data

May 3, 1988 [DE] Fed. Rep. of Germany ....... 3814973

[51] Int. Cl.$^5$ ............................................. C08G 63/48

[52] U.S. Cl. ..................................... 525/63; 525/391; 525/392; 525/393

[58] Field of Search ................... 525/391, 392, 393, 63

[56] References Cited

FOREIGN PATENT DOCUMENTS 2659357 7/1978 Fed. Rep. of Germany .
2035337 6/1980 United Kingdom ................ 525/393
1590549 1/1981 United Kingdom .

Primary Examiner—Melvyn I. Marquis
Attorney, Agent, or Firm—Connolly and Hutz

[57] ABSTRACT

Thermoplastic molding compounds of polyphenylene ether, a graft polymer of resin-forming monomers on silicone rubber and, optionally, a resin-like thermoplastic, a process for their production and their use for the production of moldings.

8 Claims, No Drawings

POLYPHENYLENE ETHER MOLDING COMPOSITIONS

This invention relates to thermoplastic molding compositions of:

A.

1 to 99 parts by weight, preferably 20 to 95 parts by weight and more preferably 40 to 90 parts by weight of a resin-like polyphenylene ether, preferably poly-(2,6-dimethyl-1,4-phenylene)-ether

B.

1 to 99 parts by weight, preferably 5 to 80 parts by weight and more preferably 10 to 60 parts by weight of a graft polymer of

B.1

5 to 90% by weight, preferably 30 to 80% by weight and more preferably 55 to 70% by weight of a mixture of

B.1.1

60 to 100% by weight, preferably 90 to 100% by weight and more preferably 95 to 100% by weight of an aromatic alkenyl compound, preferably styrene, and

B.1.2

0 to 40% by weight, preferably 0 to 10% by weight and more preferably 0 to 5% by weight of an $\alpha,\beta$-unsaturated compound copolymerizable with B.1.1, preferably maleic anhydride, acrylonitrile, methacrylonitrile, $C_1$–$C_8$ alkylacrylate, $C_1$–$C_8$ alkyl methacrylate on

B.2

10 to 95% by weight, preferably 20 to 70% by weight and more preferably 30 to 45% by weight silicone rubber having an average particle diameter $d_{50}$ of from 0.05 to 1 $\mu$m and preferably from 0.09 to 0.4 $\mu$m and a gel content of more than 50% by weight, preferably more than 70% by weight and, more preferably, from 73 to 98% by weight, obtainable from
 a. dihalodiorganosilane,
 b. 0 to 10 mol-%, based on a., trihaloorganosilane,
 c. 0 to 3 mol-%, based on a., tetrahalosilane and
 d. 0 to 0.5 mol-%, based on a., halotriorganosilane, the organyl radicals of the compounds a., b. and d. being
 $\alpha$. $C_1$–$C_6$ alkyl or cyclohexyl, preferably methyl, ethyl,
 $\beta$. $C_6$–$C_{12}$ aryl, preferably phenyl,
 $\gamma$. $C_1$–$C_6$ alkenyl, preferably vinyl, allyl,
 $\delta$. mercapto-$C_1$–$C_6$-alkyl, preferably mercaptopropyl, with the proviso that 2 to 10 mol-% of all organyl radicals in the compounds (a), (b) and (d) correspond to the formula $\gamma + \delta$ and the molar ratio of the radicals $\gamma:\delta$ is 3:1 to 1:3 and preferably 2:1 to 1:2, and

C.

per 100 parts by weight A+B, 0 to 80 parts by weight and preferably 0 to 50 parts by weight of a thermoplastic polymer of

C.1

60 to 100 % by weight, preferably 90 to 100% by weight and more preferably 95 to 100% by weight of an aromatic alkenyl compound, preferably styrene, and

C.2

0 to 40% by weight, preferably 0 to 10% by weight and more preferably 0 to 5% by weight of an $\alpha,\beta$-unsaturated compound copolymerizable with C.1, preferably maleic anhydride, acrylonitrile, methacrylonitrile, $C_1$–$C_8$ alkyl methacrylate, $C_1$–$C_8$ alkyl acrylate.

It is known that the impact strength of polyphenylene ether resins can be improved by the addition of certain elastomers.

Thus, US-PS 3,383,435 describes mixtures of polyphenylene ethers and rubber-modified styrene polymers of which the rubber component is an unsaturated polymer, for example polybutadiene.

According to US-PS 3,658,945 and US-PS 3,943,191, EPDM rubbers optionally modified with styrene polymers are proposed for improving the impact strength of polyphenylene ethers.

US-PS 3,737,479 describes mixtures of polyphenylene ethers and polysiloxanes.

DE-OS 2 947 421 describes mixtures of polyphenylene ethers and polysiloxane-modified aromatic polyalkenyl compounds which are distinguished by high impact strength, good processability and thermal stability.

According to DE-OS 2 659 357, molding compounds of thermoplastic resins, such as polyphenylene ethers, and graft copolymers on polysiloxanes or silicone rubbers show high impact strength, even at low temperatures.

However, the toughness of all these polyphenylene ether molding compounds is still not sufficient for many applications, including in particular the production of exterior automotive components.

It has now been found that the above-defined molding compositions according to the invention of polyphenylene ether resins and special graft polymers, optionally aromatic alkenyl (co)polymers and standard auxiliaries and additives show excellent toughness and weather resistance.

Polyphenylene ethers (component A) suitable for use in accordance with the invention correspond to formula I

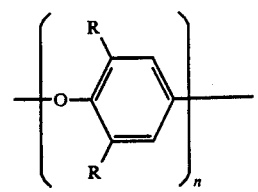

in which
the ether oxygen atom of one unit is attached to the aromatic nucleus of the adjacent unit, a positive integer of $\geq 50$ and each substituent R is hydrogen, halogen, hydrocarbon radicals without a tertiary $\alpha$-carbon atom, halogenated hydrocarbon radicals containing at least 2 carbon atoms between the halogen atom and the phenyl nucleus, hydrocarbonoxy radicals and halogenated hydrocarbonoxy radicals containing at least 2 carbon atoms between the halogen atom and the phenyl nucleus. Polyphenylene ethers corresponding to the above formula and their production by catalyzed oxidative coupling from phenols, metal amine complex catalysts and an oxygen-containing gas are described in U.S. Pat. Nos. 3,306,874; 3,306,875; 3,257,357 and 3,257,358.

Poly-(2,6-dimethyl-1,4-phenylene)-ether is preferred as component A.

Graft polymers B in the context of the invention are those of which the graft shell B.1 consists predominantly of polymerized aromatic alkenyl compounds B.1.corresponding to formula II

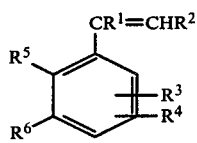

II in which
R$^1$ and R$^2$ represent hydrogen, C$_1$–C$_6$ alkyl and C$_2$–C$_6$ alkenyl, R$^3$ and R$^4$ represent chlorine, bromine, hydrogen and C$_1$–C$_6$ alkyl and R$^5$ and R$^6$ represent hydrogen, C$_1$–C$_6$ alkyl and C$_2$–C$_6$ alkenyl, in addition to which R$^5$ and R$^6$ may also be attached to one another by hydrocarbon radicals (and may form, for example, a naphthyl group).

Examples of aromatic alkenyl compounds are styrene, bromostyrene, chlorostyrene, α-methylstyrene, vinyl xylene, divinyl benzene, vinyl naphthalene and vinyl toluene.

The preferred component B.1.1 is styrene.

In addition, the graft shell B.1 may contain other α,β-unsaturated monomers B.1.2 copolymerizable with B.1.1, for example anhydrides of unsaturated carboxylic acids, alkenyl cyanides, C$_1$–C$_8$ alkyl acrylates and C$_1$–C$_8$ alkyl methacrylates. Maleic anhydride, acrylonitrile, methacrylonitrile, methyl methacrylate, n-butyl acrylate, t-butyl acrylate and t-butyl methacrylate are preferred. At least 60% by weight, preferably at least 90% by weight and more preferably at least 95% by weight of the graft shell B.1 should be synthesized from the aromatic alkenyl compounds B.1.1.

The graft base B.2 is a particulate silicone rubber having an average particle diameter of from 0.05 to 1 μm and preferably from 0.09 to 0.4 μm and a gel content of more than 50% by weight, preferably more than 70% by weight and, more preferably, between 73 and 98% by weight.

The average particle diamater $d_{50}$ is the diameter above which 50% by weight of the particles and below which 50% by weight of the particles lie. It may be determined by ultracentrifuge measurements (W. Scholtan, H. Lange, Kolloid. Z. and Z. Polymere 250 (1972) 782–796).

The gel content is determined in acetone at 25.C; cf. DE-PS No. 2 421 288, column 7, lines 17 to 37.

Preferred silicone rubbers B.2 are those in which at least 80 mol-% of the organyl radicals consist of methyl groups.

A diorganyl hydroxy siloxy unit, preferably a dimethyl hydroxy siloxy unit, generally functions as the terminal group.

Preferred silanes a to d for the production of the silicone rubbers B.2 preferably contain chlorine as halogen substituent.

In the context of the invention, "obtainable" means that the silicone rubber B.2 does not necessarily have to be produced from the halogen compounds a–d, the definition also encompassing silicone rubbers B.2 of the same structure which have been produced from silanes containing other hydrolyzable groups such as, for example, C$_1$–C$_6$ alkoxy groups.

In the production of the graft polymers B by graft polymerization, free polymers or copolymers of the graft monomers forming the graft shell are generally also formed to a certain extent in addition to the actual graft copolymer.

Accordingly, graft polymers B in the context of the invention are products obtained by polymerization of the graft monomers B.1 in the presence of the silicone rubber B.2, strictly speaking, therefore, generally a mixture of graft copolymer and free (co)polymer of the graft monomers B.1.

The graft polymers B may be prepared by radical graft polymerization, for example in accordance with DE-PS 2 421 288, for example by the following method:

The silicone rubber B.2 is initially prepared in a first stage by emulsion polymerization of a silicone oligomer, preferably a cyclic silicone oligomer, such as for example octamethyl cyclotetrasiloxane.

The preparation of an emulsion of a long-chain OH-terminated silicone oil by emulsion polymerization is known in principle to the expert, cf. for example US-PS No. 2,891,910 and GB-PS No. 1,024,024. Particular preference is attributed to the process disclosed in the British patent which uses an alkyl benzene sulfonic acid, because in this case the emulsifier and polymerization catalyst are one and the same. On completion of polymerization, the acid is neutralized.

Accordingly, the concentration of emulsifier may be kept to a minimum and, after preparation of the emulsion, the end product contains very few troublesome foreign molecules from the catalyst. Instead of the alkyl benzene sulfonic acids mentioned, however, it is also possible to use n-alkyl sulfonic acids. In addition, co-emulsifiers may be used in addition to the catalytically active sulfonic acid.

The co-emulsifiers may be nonionic and anionic. Suitable anionic co-emulsifiers are, in particular, salts of the above-mentioned n-alkyl sulfonic acids or alkyl benzene sulfonic acids. Suitable nonionic co-emulsifiers are polyoxyethylene derivatives of fatty alcohols and fatty acids. Examples of such emulsifiers are POE (3) lauryl alcohol, POE (20) oleyl alcohol, POE (7) nonyl phenol or POE (10) stearate (the notation POE (x) lauryl alcohol means that x units ethylene oxide have been added onto one molecule lauryl alcohol, the number x being an average value).

In general, silicone oils formed by emulsion polymerization in the presence of nonionic co-emulsifiers are of lower molecular weight than those where no coemulsifier has been used. The molecular weight of the OH-terminated silicone oil formed during the emulsion polymerization is controlled, for example, through the temperature during the establishment of an equilibrium between siloxane, water and the silanol initially formed by ring-opening of the siloxane (for particulars of the relationship between temperature and molecular weight, see D. R. Weyenberg et al., J. Polym. Sci., Part C, 27, pages 28 to 34 (1969)).

The groups γ and δ may be introduced into the silicone polymer by working in the presence of suitable siloxane oligomers. Suitable starting oligomers are, for example, tetramethyl tetravinyl cyclotetrasiloxane or γ-mercaptopropylmethyl dimethoxysilane or its hydrolyzate.

These functional oligomers are added to the main oligomer, for example octamethyl cyclotetrasiloxane, in the desired quantities.

Relatively long-chain radicals, such as ethyl, propyl and phenyl groups, may also be similarly incorporated.

Adequate crosslinking of the silicone rubber may actually be obtained if the radicals γ and δ react with one another during the emulsion polymerization, so that there is no need to add an external crosslinking agent. However, a crosslinking silane may be added to increase the degree of crosslinking of the silicone rubber.

Branching or crosslinking may be obtained by the addition of, for example, tetraethoxy silane or of a silane corresponding to the general formula organyl - $SiX_3$, where X is a hydrolyzable group, more especially the alkoxy radical. In addition to tetraethoxy silane, methyl trimethoxy silane and phenyl trimethoxy silane are particularly preferred.

The graft base B.2 may also be a polymer having a "core/shell" structure. To produce such a structure, an acrylate rubber ("shell") may be produced in the presence of a silicone rubber latex ("core") by emulsion polymerization. To this end, the alkyl acrylate is emulsified in the silicone rubber latex and the resulting emulsion is polymerized in known manner using radical-forming initiators. The acrylate rubber polymerizes onto the silicone rubber and forms a shell around the silicone rubber particles. It may be crosslinked during its actual production by the co-use of polyfunctional monomers. In the graft polymerization of the acrylate rubber shell, the formation of new particles should be avoided as far as possible, i.e. the emulsifier must be present in a quantity just sufficient to cover the surface of the particles. In the formation of the acrylate rubber shell, the alkyl acrylates may be replaced completely or partly by other monomers, such as isoprene, butadiene, chloroprene, ethylene, if necessary with addition of crosslinking, polyfunctional monomers, such as divinyl benzene, triallyl cyanurate.

However, a core/shell rubber particle may also have an "inverse" structure to that described above, i.e. a preferably crosslinked silicone rubber shell may be formed around an elastomeric core, for example of crosslinked acrylate rubber. In this case, too, the alkyl acrylates may also be completely or partly replaced by other rubberforming monomers, such as isoprene, butadiene, chloroprene, ethylene and, optionally, crosslinking monomers, such as divinyl benzene, triallyl cyanurate.

It is also possible for the core to have no elasticity at all, i.e. the core may be a thermoplastic polymer (providing it can be produced in a suitable particle size by emulsion polymerization), such as polypropylene, styrene/acrylonitrile copolymer, polymethyl methacrylate. This thermoplastic core is then surrounded by a crosslinked silicone rubber shell.

To produce the graft copolymer B, the graft monomers B.1.1 and B.1.2 may be radically graft-polymerized in the presence of the silicone rubber B.2 (including the core/shell variants mentioned above), more especially at 40 to 90° C. The graft polymerization may be carried out in suspension, dispersion or emulsion. Continuous or discontinuous emulsion graft polymerization is preferred. This graft polymerization is carried out using radical initiators, for example peroxides, azo compounds, hydroperoxides, persulfates, perphosphates, optionally in the presence of anionic emulsifiers, for example carboxonium salts, sulfonic acid salts or organic sulfates. Graft polymers are formed in high graft yields, i.e. a high proportion of the polymer of the monomers B.1 is chemically joined to the silicone rubber B.2. This special silicone rubber B.2 eliminates the need for special measures (to obtain a high graft yield).

The graft polymers B thus prepared may be worked up by known methods, for example by coagulation of the latices with aqueous electrolytes (salts, acids or mixtures thereof) and subsequent purification and drying.

The molding compositions according to the invention contain 1 to 99 parts by weight, preferably 20 to 95 parts by weight and more preferably 40 to 90 parts by weight of component A and 1 to 99 parts by weight, preferably 5 to 80 parts by weight and more preferably 10 to 60 parts by weight of component B.

In addition, the molding compositions according to the invention may contain—per 100 parts by weight A+B—up to 80 parts by weight and preferably up to 50 parts by weight of a thermoplastic rubber-free polymer C which is predominantly synthesized from aromatic alkenyl compounds C.1 and may contain at most 40% by weight, preferably at most 10% by weight and, more preferably, at most 5% by weight of other compounds C.2 copolymerizable with C.1. The monomers according to C.1 correspond to those mentioned above under B.1.1 while the monomers according to C.2 correspond to those mentioned above under B.1.2.

The quantity of component C usable in accordance with the invention does not include the free, i.e. ungrafted, resins of the same composition (B.1) optionally formed as secondary products in the preparation of B. The preferred component C is polystyrene.

The (co)polymers C are known and may be prepared by radical polymerization, more especially by emulsion, suspension, solution or bulk polymerization. They preferably have molecular weights $M_w$ (weight average, as determined by light scattering or sedimentation) of from 15,000 to 200,000.

The molding compositions according to the invention may contain other known additives for aromatic polyesters and graft polymers, such as stabilizers, pigments, mold release agents, flameproofing agents, fillers and reinforcing materials and antistatic agents in the usual quantities.

The molding Compositions according to the invention may be prepared by mixing the constituents in known manner and melt-compounding or melt-extruding the resulting mixture at elevated temperature, preferably at 200 to 350° C, in standard units, such as internal kneaders, extruders or twin-screw extruders. The individual components may be mixed successively or simultaneously.

Accordingly, the present invention also relates to a process for the production of the described molding compositions by mixing of the components at elevated temperature.

The molding compositions according to the invention may be used for the production of moldings of any kind, for example by injection molding. Examples of moldings are housing parts (for example for domestic appliances, such as juice presses, coffee machines, mixers), cover panels for the building industry, automotive components. In addition, they are used for electrical equipment, for example for multiway connectors, because they have very good electrical properties.

Moldings may also be produced by deep-drawing from prefabricated sheets or films.

Accordingly, the present invention also relates to the use of the described molding compositions for the production of moldings.

EXAMPLES

Components used:

A. Polyphenylene ether

Poly-(2,6-dimethyl-1,4-phenylene)-ether having a relative solution viscosity $\eta_{rel}$ of 1.262, as measured on a 0.5% by weight solution in chloroform at 25° C.

B. Graft polymers

1. Preparation of the silicone rubber emulsion (base B.2 according to the invention)

38.4 parts octamethyl cyclotetrasiloxane, 1.2 parts tetramethyl tetravinyl cyclotetrasiloxane and 1 part γ-mercaptopropyl methyl dimethoxy siloxane are stirred with one another, 0.5 part dodecyl benzenesulfonic acid is added, followed by the introduction over a period of 1 hour with intensive stirring of 58.4 parts water. The preemulsion is homogenized twice at 200 bar in a high-pressure emulsifying machine. Another 0.5 part dodecyl benzenesulfonic acid is added, after which the emulsion is stirred first for 2 h at 85° C and then for 36 h at 20° C, followed by neutralization with 5N NaOH. A stable emulsion having a solids content of approximately 36% by weight is obtained. The polymer has a gel content of 82% by weight, as measured in toluene, and an average particle size of 300 nm.

2. Preparation of the graft polymer B.I according to the invention 2107 parts latex B.2 and 1073 parts water are introduced into a reactor. After initiation with a solution of 7.5 parts potassium peroxydisulfate in 195 parts water at 65.C, the following inflows are uniformly introduced into the reactor over a period of 4 h:

Inflow 1: 759 parts styrene
Inflow 2: solution of
    15 parts of the Na salt of $C_{14}$–$C_{18}$ alkyl sulfonic acids in
    375 parts water.

Polymerization is then completed over a period of 6 h at 65° C, resulting in a latex having a solids content of approximately 33% by weight.

After coagulation with an aqueous magnesium sulfate/acetic acid solution, filtration and drying in vacuo, the graft polymer is obtained in the form of a white powder.

3. Graft polymer B.II (comparison)

Graft polymer of 50 parts by weight styrene on 50 parts by weight of a partially crosslinked, coarse-particle polybutadiene having an average particle diameter of 0.4 μm ($d_{50}$ value) and a gel content of 79% by weight prepared by emulsion polymerization.

Production and testing of the molding compounds according to the invention

Components A and B were compounded at 230 to 240 C in a 1.3 liter internal kneader.

Bars measuring 80×10×4 mm (processing temperature 300° C) were made from the molding compounds in an injection-molding machine and were used to determine notched impact strength (by ISO method 180 1 A) at room temperature, −30° C and −50° C.

The Vicat B softening point was determined in accordance with DIN 53 460.

As the following Table shows, the molding compounds according to the invention show a distinctly higher level of toughness and heat resistance for the same total rubber content.

| Composition and properties of the molding compounds | | | | | | |
|---|---|---|---|---|---|---|
| Components | | | Notched impact strength ($kJ/m^2$) | | | Softening point |
| A | B.I | B.II | RT | −30° C. | −50° C. | (°C.) |
| Example according to the invention | | | | | | |
| 60 | 40 | | 44.5 | 35.7 | 33.1 | 163 |
| Comparison Example | | | | | | |
| 60 | | 40 | 8.0 | | | 144 |

We claim:
1. Thermoplastic molding compositions comprising:
A. 1 to 99 parts by weight of a polyphenylene ether resin and
B. 1 to 99 parts by weight of a graft polymer comprising 5 to 90% by weight of a mixture, B.1, grafted on 10 to 95% by weight of a silicone rubber, B.2, and
C. 0 to 80 parts by weight per 100 parts A+B of a thermoplastic polymer of 60 to 100% by weight of an aromatic alkenyl compound, C.1, and 0 to 40% by weight of an other α, β-unsaturated compound, C.2, copolymerizable with C.1,
wherein
B.1 comprises a mixture of 60 to 100% by weight of an aromatic alkenyl compound, B.1.1, and 0 to 40% by weight of an other α, β-unsaturated compound, B.1.2, copolymerizable with B.1.1, and
B.2 is a silicone rubber substituted with $C_1$–$C_6$ alkyl or cyclohexyl radicals, $C_6$–$C_{12}$ aryl radicals, $C_1$–$C_6$alkenyl radicals, mercapto-$C_1$-$C_6$-alkyl radicals or mixtures thereof, wherein 2 to 10 mol-% of said radicals are i. $C_1$–$C_6$ alkenyl and ii. mercapto-$C_1$-$C_6$-alkyl groups, the molar ratio of i:ii being 3:1 to 1:3, said rubber having an average particle diameter $d_{50}$ of 0.05 to 1 μm and a gel content of more than 50% by weight.

2. Molding compositions as claimed in claim 1 based on 20 to 95 parts by weight of component A and 5 to 80 parts by weight of component B.

3. Molding compositions as claimed in claim 1 which the graft polymer B is prepared from 30 to 80% by weight B.1 and 20 to 70% by weight B.2.

4. Molding compositions as claimed in claim 1 containing stabilizers, pigments, mold release agents, flame-proofing agents, reinforcing materials, antistatic agents or mixtures thereof.

5. Compositions according to claim 1 wherein the silicone rubber, B.2, is produced by the polymerization of:
a. dihalodiorganosilane and
b. 0 to 10 mol-%, based on a., of a trihaloorganosilane,
c. 0 to 3 mol-% based on a., of a tetrahalosilane and
d. 0 to 0.5 mol-%, based on a., of a halotriorganosilane, wherein the organic radicals on said silanes are
- α. $C_1$–$C_6$ alkyl or cyclohexyl,
- β. $C_6$–$C_{12}$ aryl,
- γ. $C_1$–$C_6$ alkenyl,
- δ. mercapto-$C_1$–C6-alkyl or mixtures thereof with the proviso that 2 to 10 mol-% of all the organic radicals on said silanes in compounds a., b. and d. is a mixture of γ+δ and the molar ratio of the radicals γ:δ is 3:1 to 1:3.

6. Compositions according to claim 1 wherein said molar ratio is 2:1 to 1:2.

7. Compositions according to claim 1 wherein said α, β-unsaturated compound, B.1.2, is an unsaturated carboxylic acid anhydride or an alkenyl cyanide, a $C_1$–$C_8$ alkyl acrylate, a $C_1$–$C_8$ alkylmethacrylate, acrylonitrile or methacrylonitrile.

8. Molding compositions as claimed in claim 5 wherein α is a methyl or ethyl radial, β is a phenyl radical, γ is a vinyl or allyl radical and γ is a mercaptopropyl radical, the molar ratio of γ:δ being from 2:1 to 1:2.

* * * * *